Feb. 19, 1935.  V. H. BURDICK  1,991,360
ATTACHMENT FOR AUTOMOBILE BRAKES
Filed Oct. 4, 1932  2 Sheets-Sheet 1
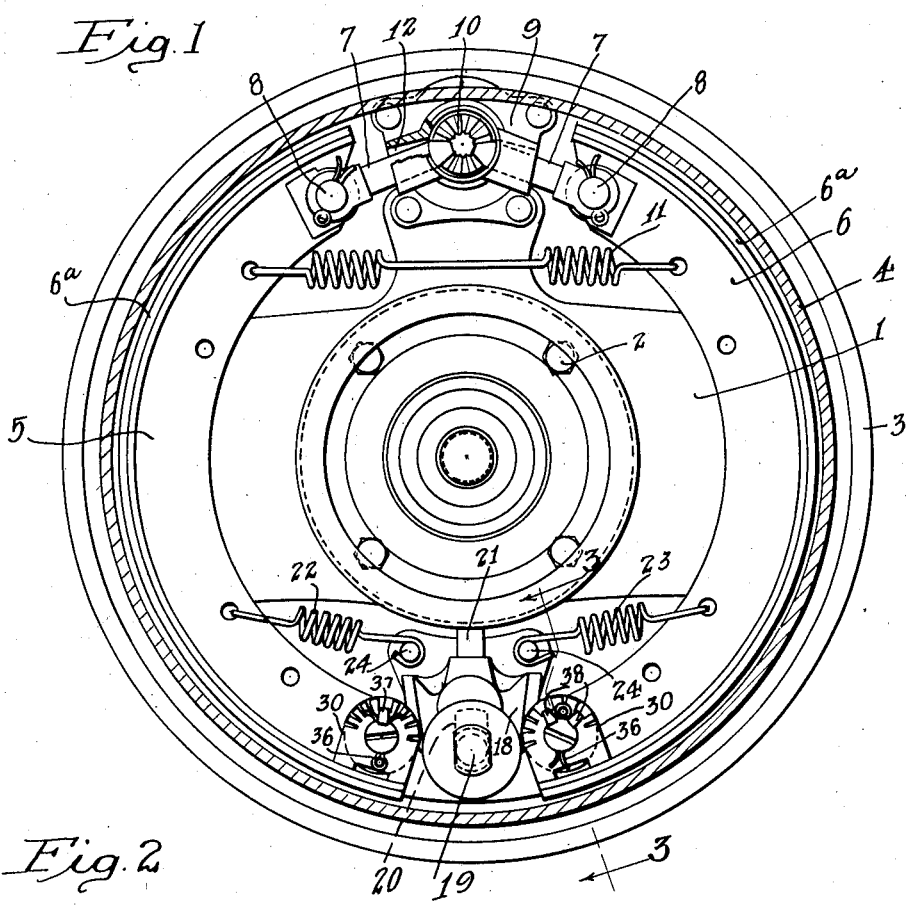
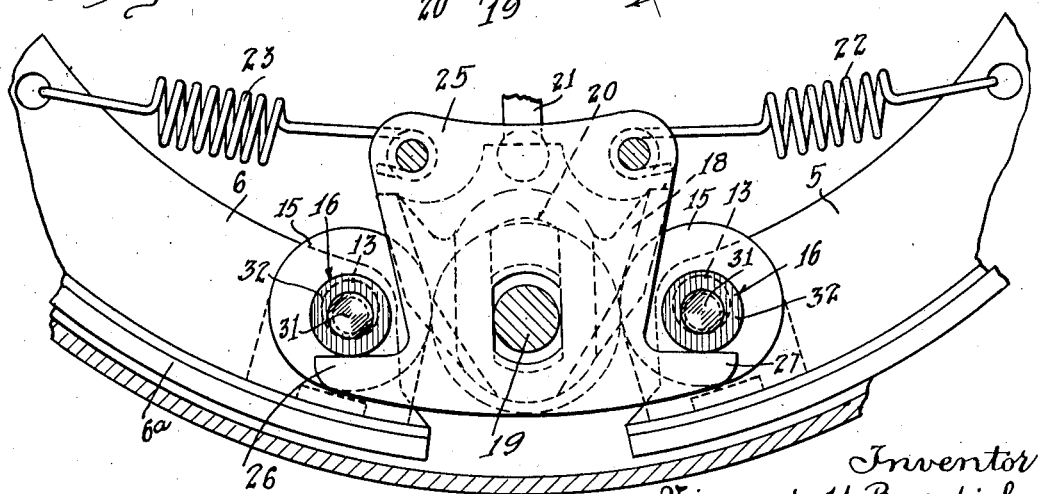
Inventor
Vincent H. Burdick
By Lyon & Lyon
Attorneys Feb. 19, 1935. V. H. BURDICK 1,991,360
ATTACHMENT FOR AUTOMOBILE BRAKES
Filed Oct. 4, 1932 2 Sheets-Sheet 2
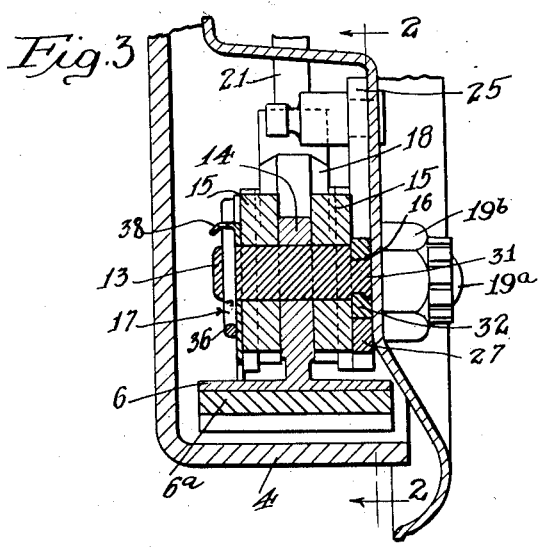
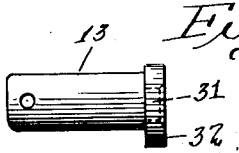
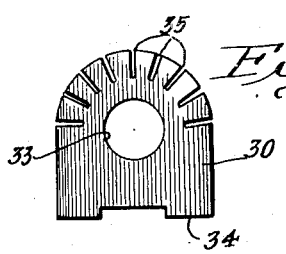
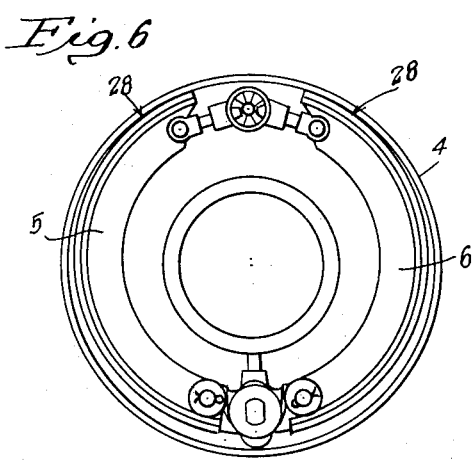
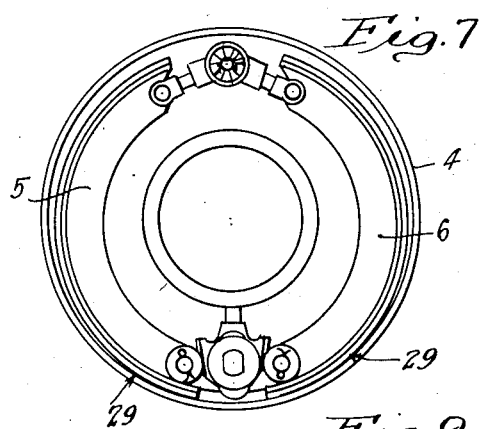
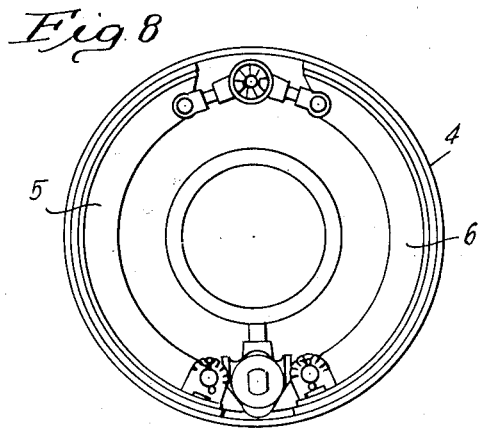
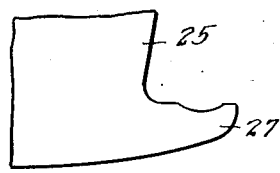
Inventor
Vincent H. Burdick
By Lyon & Lyon
Attorneys Patented Feb. 19, 1935

1,991,360

UNITED STATES PATENT OFFICE 1,991,360

ATTACHMENT FOR AUTOMOBILE BRAKES

Vincent H. Burdick, Gardena, Calif.

Application October 4, 1932, Serial No. 636,106

5 Claims. (Cl. 188—79.5)

This invention relates to automobile braking systems, and, especially, to the adjustment of brakes of a particular type used on a widely used type or make of automobile.

The automobile to which this invention relates more particularly, utilizes internal expanding brakes which comprise a pair of shoes juxtaposed to each other within a brake drum, whereby the shoes, when they are separated from each other, bear against the inside surface of the drum. The shoes are supported at each end and may be moved toward or away from the adjacent drum surface by moving either end. A wedge or cam mechanism operated from the brake pedal of the automobile is provided to separate the two brake shoes at one end to apply the brakes and a wedge operated by an adjusting bolt is provided to separate the opposite end of the two brakes for adjustment purposes.

The movement of the wedge or cam for applying the brakes in response to movement of the brake pedal, applies a force to the shoes tending to carry them in the direction of movement of the wedge or cam, and to prevent the brake shoes from responding and moving in response to this force, a guide is provided which bears against a part of the shoe and forces the shoe to move in a line at right angles to the path of movement of the wedge or cam. This guide, however, is not readily adjustable; furthermore, it wears rapidly at its point of contact with the part of the shoe with which it engages. As a result, the shoes are often not positioned concentrically with respect to the drum, and contact therewith only at the heel or at the toe, according to whether the shoes are positioned too high or too low with respect to the drum.

A broad object of this invention is to provide an attachment or replacement part for use with brakes of the type described, whereby the brake shoes can be accurately positioned in concentric relation to the drum.

Another object is to prevent unnecessary friction and resultant wear between the brake shoe guide and the element attached to the brake shoe which contacts with the guide.

Other objects and features of the invention will be apparent from the detailed description, read in connection with the accompanying drawings, in which Figure 1 is an elevational view of an automobile brake of the type to which this invention relates as it would appear with the brake drum and wheel removed, the portion of the brake drum with which the brake shoes engage being shown in section;

Figure 2 is a detailed view of the lower part of the brake mechanism shown in Figure 1, taken from the rear side and in the plane 2—2 of Figure 3;

Figure 3 is a sectional view taken in the plane 3—3 of Figure 1;

Figure 4 is a plan view of the pin which is an essential feature of the invention;

Figure 5 is a plan view of a lock plate which forms a part of the invention;

Figures 6 and 7 are schematic views showing brakes of the type disclosed in Figure 1, in which the brake shoes are improperly adjusted; and Figure 8 is a schematic view showing a brake in which the shoes are properly adjusted; and Figure 9 is a detailed view, showing the result of wear on the brake guide disclosed in Figure 2.

Referring to Figure 1, the automobile brake to which this invention relates comprises a fixed frame plate 1 which is rigidly attached, as by bolts 2, to the axle of the automobile (not shown) on which it is mounted, this plate in its usual form having an outer edge 3 which is curved to fit around the inner edge of the brake drum 4 and form a rough seal therewith to prevent the entry of water, mud and other foreign matter. Attached to the frame plate 1 at the top and the bottom are a pair of brake shoes 5 and 6, respectively, each brake shoe comprising a substantially rigid arcuate frame having a facing of brake lining 6a adapted to engage with the inner surface of the brake drum 4 when the brake is applied.

Each brake shoe 5 and 6 is supported at its upper end from the frame plate 1 by a toggle 7 which is pivotally connected at its outer end by a pivot 8 to the brake shoe and is supported in a guide 9 which is riveted securely to the frame plate 1. The guides 9 restrict vertical movement of the toggles 7. The latter are prevented from moving inwardly by a conical adjusting wedge 10 with which they contact. The conical adjusting wedge 10 is provided with a corrugated surface, as shown, and the inner ends of the toggles 7 have tapered edges to correspond with the taper of the cone 10. The brake shoes 5 and 6 are normally maintained in tension toward each other, thus forcing the inner ends of toggle 7 into contact with the wedge 10, by a spiral spring 11.

As shown at 12, the toggles 7 fit relatively loosely in the apertures provided therefor in the guides 9 so that they have considerable free movement in a vertical direction.

The lower end of each brake shoe 5 and 6 is provided with a transverse pin 13 (Figures 3 and 4), which fits snugly in an aperture provided in the brake shoe reinforcing rib 14 and extends beyond the rib a substantial distance on either side. Pin 13 serves to pivotally support, with respect to the reinforcing rib 14 of each brake shoe, a pair of rollers 15 which are positioned on each side of the rim 14. The pin 13 is provided with a head 16 on its inner end, and a cotter pin 17 on the opposite end to prevent the roller 15 from becoming detached.

Rollers 15 normally bear against a wedge 18 (Figs. 1 and 2) which serve to apply and release the brakes. Thus the wedge 18 is slidably mounted for vertical movement with respect to the frame 1 upon a guide pin 19. The guide pin 19 is rigidly attached to the frame 1 and fits within a longitudinal slot 20 in the wedge 18. Thus the pin 19 has a threaded end 19$^a$ of reduced diameter, which projects through a hole provided therefor in the plate 1 and is locked in position by a castellated nut 19$^b$ (Fig. 3). The wedge 18 is adapted to be depressed in response to downward movement of an actuating pin 21 when the brake pedal of the automobile is depressed. This mechanism of course is not a part of the present invention and therefore need not be described in detail.

The lower ends of the brake shoes 5 and 6 are normally maintained in their innermost positions, in which the rollers 15 are maintained in contact with the wedge 18 by springs 22 and 23, respectively, each spring being attached at one end to its associated brake shoe and at the other end to a pin 24 secured to the frame plate 1.

To restrain downward movement of the brake shoes 5 and 6 and force the latter to move outwardly against the brake drum 4 in response to downward movement of the wedge 18, a bracket 25, having a pair of horizontally extending ears 26 and 27, respectively, is secured to the frame plate 1. The shape of this bracket 25 is clearly shown in Figure 2, which is a sectional view taken in a plane coincident with the inner surface of the bracket.

It will be observed from an inspection of Figure 2 that the upper edges of the ears 26 and 27 are substantially horizontal and bear against the heads 16 of the pivot pins 13 on which rollers 15 are mounted. Because of the fact that the heads 16 rest upon these guide ears 26 and 27, respectively, the lower ends of shoes 5 and 6 are restrained from downward movement with the wedge 18 and are forced to move outwardly against the brake drum 4 as the wedge 18 descends.

The apparatus described comprises the standard equipment now in use and has the objectionable feature that either as a result of inaccuracy in manufacture or of normal wear the upper edges of the guide ears 26 and 27 are often so positioned with respect to the heads 16 of the pins 13 that the brake shoes 5 and 6 are not positioned concentrically with respect to the drum 4. Thus the plate 25 may be positioned slightly too high; this maintains the shoes too high so that when the brakes are applied by depressing the wedge 18 only the heels of the brake shoes contact with the drum, as shown at points 28 in Figure 6. On the other hand, the plate 25 may be initially positioned too low or the upper edges of the ears 26 and 27 may be worn away, as a result of use, to the shape shown in Figure 9. In this event the brake shoes are positioned too low with respect to the brake drum and when the brakes are applied by depressing wedge 18, only the toes of the brake shoes contact with the brake drum as shown at 29 in Figure 7.

To permit proper vertical adjustment of the brake shoes, I provide, in accordance with the present invention, a special form of pin 13 together with a lock plate 30 for locking the pin in a particular, desired position.

The conventional pin 13 is simply an ordinary pin having a solid circular head concentric with respect to the rest of the pin. The special pin which I provide is similar to the conventional pin, except that it is provided with a rotatable head concentrically mounted with respect to the rest of the pin. Thus, as shown in Fig. 3, the body of the pin proper is provided with an extension 31 which extension is cylindrical in shape but has its axis eccentric with respect to the main body of the pin. This extension 31 supports a roller or rotatable rim 32. The end of the extension 31 is riveted down, as shown in Fig. 3, to maintain the roller 32 in position.

Referring now to Fig. 2, it will be observed that because of the eccentric mounting of the roller head 32 upon the pin 13, the vertical position of the lower end of each brake shoe may be varied by rotating the pin. Thus in Fig. 3 the pin 13, associated with brake shoe 5, is rotated into such a position as to elevate the shoe with respect to the guide 27. By turning the pin 13 through half a revolution, the shoe would be lowered substantially. It is obvious, therefore, that by rotating the pin 13 associated with either shoe 5 or 6 into a desired position, the exact vertical positioning of the shoe relative to the drum may be accurately adjusted. The pins 13 are slotted at the outer ends as shown clearly in Figure 1, so that they may be readily turned with a screwdriver during the adjusting operation. When the proper adjustment has been attained, the pin 13 is locked in position by means of plate 30.

Referring to Figures 1 and 5, plate 30 comprises simply a washer of thin sheet metal having a central opening 33 to receive the pin 13 and has a substantially flat lower edge 34 adapted to rest against the brake shoe and thereby prevent any possible rotation of the plate. The upper portion of plate 30 is arcuate in shape to conform roughly with the curvature of the roller 15 against which it rests, and is provided with a plurality of radial cuts 35.

After the plate 30 has been slipped over the end of the pin 13 (the latter having been adjusted as previously described), a cotter key 36 is inserted in a hole provided therefor in the end of pin 13 and the ends of the pin spread apart, as shown in Fig. 1, to maintain the cotter key in position. The pin 13 is then locked against any rotation by bending one or more of the segments of plate 30 defined by the radial cuts 35 into engagement with the cotter key. Thus, referring to Fig. 1, the cotter key may be so positioned that one of the segments 37 may be bent down between the separated ends of the cotter key, or, if the head of the cotter key is uppermost, it may be locked against movement by bending over two of the segments 38 positioned on either side thereof. In either event, the cotter key 36 and the pin 13 are securely locked against any further rotation.

By replacing the conventional solid pins in brakes of the type described, with my special pins having eccentrically mounted rotatable heads, the brake shoes may be accurately adjusted vertically so that when the wedge 18 is depressed the brakes contact uniformly with the drum 4 throughout their entire length, as shown in Figure 8. Such adjustment not only increases the life of the lining of the brake shoes, but also causes them to operate much more smoothly than where only the heel or the toe of the shoe makes contact.

Although I have described a pin having an eccentric head which is rotatable with respect to the pin, it is obvious that the device may be simplified by using an eccentric solid head, and I include the use of such a solid head within the scope of my invention. However, the rotatable head is highly desirable in use for the reason that it reduces wear on the upper edge of the guide ears 26 and 27, and makes the brakes easier to apply.

It will be readily observed, from an inspection of Fig. 1, that as the shoes 5 and 6 are expanded against the rotating drum 4 one or the other of the shoes will be urged downwardly with considerable force by the friction between the shoe and the drum. Thus if the drum 4 is rotating in a clockwise direction and the brake shoes are separated by downward movement of the wedge 18, as soon as the shoe 6 begins to contact with the drum it will have a downward force exerted upon it equivalent to the frictional, or braking, resistance between the shoe and the drum. This entire force is applied through the head of the pin 13 to the guide ear 27. Therefore if there is any appreciable amount of friction between the head of the pin and the guide ear, a good deal of force will have to be applied to force the shoe outwardly into further engagement with the drum. That the force exerted on the ear 27 and the friction between it and the head of the conventional pin is very great, is evidenced by the wear which soon occurs on the upper edge of the ear 27, the extent of which wear is illustrated in Fig. 9. By rotatably mounting the head 16 upon the pin 13, the friction against the upper edge of the guide ear is greatly reduced.

As a result of friction between the solid head of the conventional pin and the guide ear, particularly when the ear becomes worn, as shown in Fig. 9, the head of the pin often binds on the guide to such an extent as to prevent the brake shoe from retracting when the wedge 18 is released. This results in a dragging brake and all the attendant troubles, such as scored brake drum, worn lining, and excessive gasoline consumption. The use of a roller head on pin 13, in accordance with my invention, effectively prevents brake binding from the cause outlined.

I have described in detail a conventional brake structure used on the front wheel of a widely used automobile, in which my attachment may be used. The rear wheel brakes of the same make of automobile are similar, except that a cam is employed to separate the toes of the brake shoes instead of the wedge 18. My attachment functions precisely the same with the cam operated brake as it does with the wedge operated brake and therefore it is unnecessary to disclose the cam operated brake in detail. It is to be understood that I do not limit my invention to a brake employing either a wedge or a cam, as the particular mechanism employed to expand the brake shoes is not material to the invention; the invention relates broadly to means for guiding the movement of a brake shoe and for adjusting it into concentric relation with the drum.

It is also to be understood that although I have shown one particular form of locking means for anchoring the pin 13 against rotation, other means may be employed, and I do not wish to limit myself to any particular form of locking means except as set forth in the appended claims.

I claim:

1. As an article of manufacture for use in connection with automobile brakes of the type described, a pin having an eccentric head on one end and a transverse aperture adjacent the opposite end to receive a lock pin, and a lock plate of thin, deformable sheet metal having an aperture to receive said pin, said plate having an approximately straight edge on one side of said aperture to bear against the rim of a brake shoe of the type described and having a plurality of segments extending radially from the aperture on the other side.

2. A brake structure comprising a supporting member, a shoe movably connected at one end to said supporting member, a pin mounted in the other end of said shoe, means for positively moving said end of said shoe, and a guide rigidly secured to said supporting member adjacent one end of said pin, a bearing member eccentrically mounted on the end of said pin for bearing against said guide and thereby limiting the path of movement of said pi nand shoe, and means for locking said pin in a desired position of rotation with respect to said shoe whereby said bearing member may be adjusted with respect to said shoe.

3. A brake structure comprising a supporting member, a shoe movably connected at one end to said supporting member, a pin mounted in the other end of said shoe, means for positively moving said end of said shoe, and a guide rigidly secured to said supporting member adjacent one end of said pin, a disc eccentrically mounted on the end of said pin for bearing against said guide and thereby limiting the path of movement of said disc and shoe, means for locking said pin in a desired position or rotation with respect to said shoe whereby said disc may be adjusted with repect to said shoe.

4. A brake structure comprising a supporting member, a shoe movably connected at one end to said supporting member, a pin mounted in the other end of said shoe, means for positively moving said end of said shoe, and a guide rigidly secured to said supporting member adjacent one end of said pin, a disc rotatably mounted on an eccentric extension on the end of said pin for bearing against the said guide and thereby limiting the path of movement of said pin and shoe, and means for locking said pin in a desired position of rotation with respect to said shoe whereby said disc may be adjusted with respect to said shoe.

5. A brake structure comprising a supporting member, a shoe movably connected at one end to said supporting member, a pin mounted in the other end of said shoe, means for positively moving said end of said shoe, a guide rigidly secured to said supporting member adjacent one end of said pin, a bearing member eccentrically mounted on one end of said pin for bearing against said guide and thereby limiting the path of movement of said pin and shoe, means for locking said pin in a desired position of rotation with respect to said shoe whereby said bearing member may be adjusted with respect to said shoe comprising a key member adapted to be fixed to said pin for rotation therewith at its opposite end, and a washer adapted to be positioned about said pin below said key member, said washer being deformable about said key member to prevent relative rotation therebetween, and being configured to bear against said brake shoe to prevent rotation with respect thereto.

VINCENT H. BURDICK.